US010132396B2

United States Patent
Tsuzuki

(10) Patent No.: US 10,132,396 B2
(45) Date of Patent: Nov. 20, 2018

(54) STATOR WHEEL OF TORQUE CONVERTER AND TORQUE CONVERTER

(71) Applicant: AISIN SEIKI KABUSHIKI KAISHA, Kariya-shi, Aichi-ken (JP)

(72) Inventor: Yukihisa Tsuzuki, Kariya (JP)

(73) Assignee: AISIN SEIKI KABUSHIKI KAISHA, Kariya, Aichi-Ken (JP)

( * ) Notice: Subject to any disclaimer, the term of this patent is extended or adjusted under 35 U.S.C. 154(b) by 317 days.

(21) Appl. No.: 14/993,456

(22) Filed: Jan. 12, 2016

(65) Prior Publication Data

US 2016/0201782 A1 Jul. 14, 2016

(30) Foreign Application Priority Data

Jan. 13, 2015 (JP) .................................. 2015-004301

(51) Int. Cl.
*F16H 41/28* (2006.01)
*F16H 41/04* (2006.01)
*F16H 41/26* (2006.01)

(52) U.S. Cl.
CPC .............. *F16H 41/04* (2013.01); *F16H 41/26* (2013.01); *F16H 41/28* (2013.01)

(58) Field of Classification Search
CPC ........................... F16H 2041/285; F16H 41/28
See application file for complete search history.

(56) References Cited

U.S. PATENT DOCUMENTS

| 5,640,849 A | 6/1997 | Abe et al. |
| 2003/0077168 A1* | 4/2003 | Jaunasse ................. F16H 41/24 415/151 |
| 2011/0311367 A1 | 12/2011 | Shiomura et al. |

FOREIGN PATENT DOCUMENTS

| JP | 2006-105282 A | 4/2006 |
| JP | 2010-190273 A | 9/2010 |

* cited by examiner

*Primary Examiner* — F. Daniel Lopez
(74) *Attorney, Agent, or Firm* — Buchanan Ingersoll & Rooney PC

(57) ABSTRACT

A stator wheel, located between a pump and a turbine of a torque converter, includes: a first annular portion configured to be rotatable about a center of rotation; a second annular portion away from the first annular portion in a radial direction of the first annular portion; and blades provided at intervals in a circumferential direction of the first annular portion, extending between the first and second annular portions in the radial direction of the first annular portion, extending toward one side in the circumferential direction as it goes in an axial direction of a rotational shaft, being formed integrally with the first and second annular portions, and including a first surface provided on one side in the circumferential direction and a second surface located on an opposite side from the first surface in the circumferential direction configured to receive pressure from the operating fluid flowing from the turbine.

3 Claims, 7 Drawing Sheets

STATOR WHEEL OF TORQUE CONVERTER AND TORQUE CONVERTER

CROSS REFERENCE TO RELATED APPLICATIONS

This application is based on and claims priority under 35 U.S.C. § 119 to Japanese Patent Application 2015-004301, filed on Jan. 13, 2015, the entire contents of which are incorporated herein by reference.

TECHNICAL FIELD

An embodiment of this disclosure relates to a stator wheel of a torque converter and a torque converter.

BACKGROUND DISCUSSION

For example, a torque converter is provided on an apparatus such as an automotive vehicle provided with an automatic transmission. The torque converter includes, for example, a pump impeller, a turbine runner, and a stator wheel. The pump impeller connected to a crankshaft of an engine is capable of transmitting power of the engine to the turbine runner connected to an input shaft of the transmission via an operating fluid.

The stator wheel includes, for example, an outer shell, an inner core, and a plurality of stator blades interposed between the outer shell and the inner core. The stator wheel regulates a direction of an operating fluid returning from the turbine runner to the pump impeller to a predetermined direction, so that amplification of power of the engine and improvement of capacity performance of the torque converter are enabled.

JP 2006-105282A (Reference 1) and JP 2010-190273A (Reference 2) are examples of the related art.

The stator wheel is often manufactured by a die-casting method which moves a metal die in an axial direction of the stator wheel. In this case, for example, the stator blades are set so as to be prevented from overlapping each other in the axial direction of the stator wheel because the metal die is moved in the axial direction of the stator wheel. Therefore, for example, the length, the number, and the shape of the stator blades may become restricted.

SUMMARY

A stator wheel according to an aspect of this disclosure is a stator wheel of a torque converter. The torque converter includes a pump configured to be rotatable in response to an input of torque from a motor and to cause operating fluid to flow by rotation; and a turbine configured to be rotatable and to be connectable to a rotational shaft in response to an input of torque from the pump via the flowing operating fluid, and to be capable of output the torque to the rotational shaft by rotation thereof. The stator wheel is located between the pump and the turbine and includes: a first annular portion configured to be rotatable about a center of rotation; a second annular portion away from the first annular portion in a radial direction of the first annular portion; and a plurality of blades provided at intervals in a circumferential direction of the first annular portion, the plurality of blades each extending between the first annular portion and the second annular portion in the radial direction of the first annular portion, extending toward one side in the circumferential direction of the first annular portion as it goes in an axial direction of the rotational shaft, being formed integrally with the first annular portion and the second annular portion, and including a first surface provided on one side in the circumferential direction of the first annular portion and a second surface located on an opposite side from the first surface in the circumferential direction of the first annular portion and configured to receive pressure, which is lower than that the first surface receives, from the operating fluid flowing from the turbine toward the pump in a state in which the pump rotates and the turbine is standstill, a radius of curvature of a first connecting portion which is a portion where the first surface and the first annular portion are connected at an end portion on one side of one of the plurality of blades in the circumferential direction of the first annular portion on a virtual plane orthogonal to the axial direction of the rotational shaft is larger than a radius of curvature of a second connecting portion, which is a portion where the second surface and the first annular portion are connected, at an end portion on the other side in the circumferential direction of the first annular portion of the other blade adjacent to the one blade on one side in the circumferential direction of the first annular portion on a virtual plane orthogonal to the axial direction of the rotational shaft.

A torque converter according to an aspect of this disclosure includes any one of the stator wheels described above.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Figure 1:
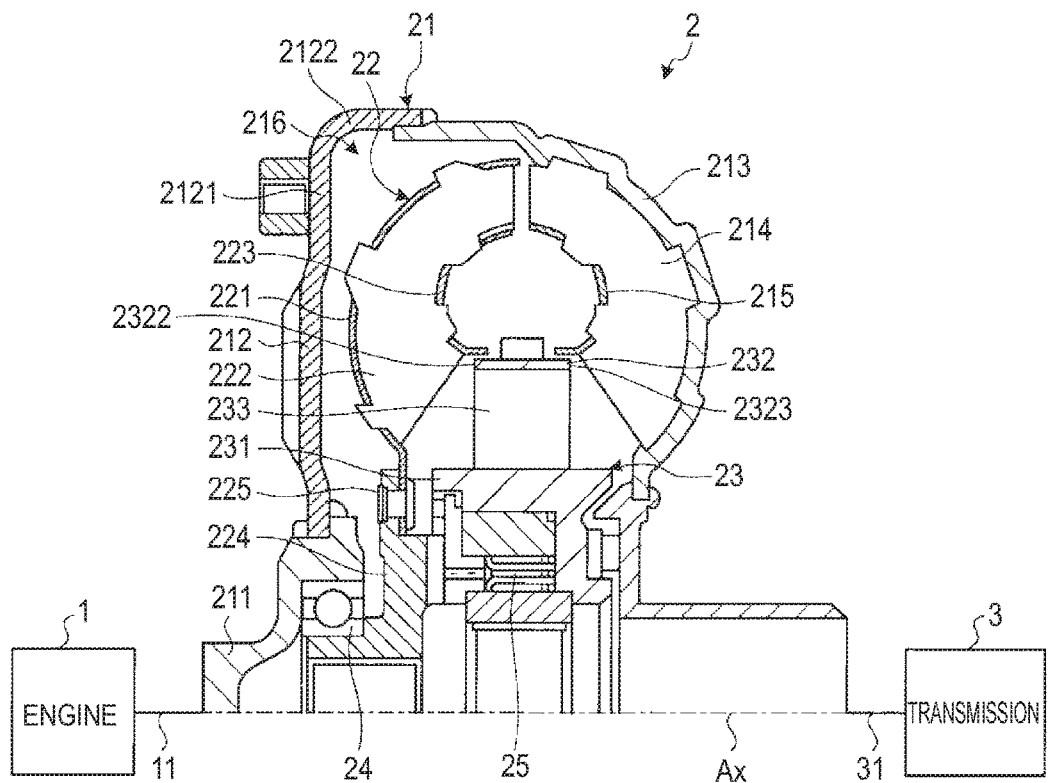
FIG. 1 is a cross-sectional view schematically illustrating a torque converter of an embodiment.

Referring now to the drawings, an embodiment will be described below with reference to FIG. 1 to FIG. 8. Components or descriptions of these components of the embodiment may be added with a plurality of expressions. However, as regards the components and descriptions, usage of other expressions which are not used here is not prevented. In addition, as regards the components and descriptions which are not added with the plurality of expressions, usage of other expressions is not prevented.

FIG. 1 is a cross-sectional view schematically illustrating a torque converter 2 of an embodiment. The torque converter 2 is, for example, mounted on an apparatus such as a motor vehicle. The torque converter 2 is not limited thereto, and may be mounted on other apparatuses.

The torque converter 2 is interposed between an engine 1 and a transmission 3. The torque converter 2 is, for example, capable of transmitting power of the engine 1 to the transmission 3 via an operating oil, which is an example of operating fluid.

The engine 1 is an example of a motor, and is a gasoline engine, for example. The motor is not limited thereto, and may be other apparatuses such as a diesel engine or an electric motor. The engine 1 includes a crankshaft 11. The crankshaft 11 is also referred to, for example, as a rotational shaft and an output shaft. The engine 1 rotates the crankshaft 11 by being driven.

The transmission 3 is, for example, an automatic transmission. The transmission 3 includes an input shaft 31. The input shaft 31 is an example of the rotational shaft. The transmission 3 is capable of transmitting torque input to the input shaft 31 to, for example, wheels.

The torque converter 2 includes a pump impeller 21, a turbine runner 22, a stator wheel 23, a bearing 24, and a one-way clutch 25. The pump impeller 21 is an example of a pump, and is also referred to, for example, as a rotating body. The turbine runner 22 is an example of a turbine, and is also referred to, for example, as a rotating body. The stator wheel 23 is also referred to as, for example, a rotating body or a fixed body.

The pump impeller 21 includes an impeller hub 211, a front cover 212, an impeller shell 213, a plurality of impeller blades 214, an impeller core 215. The impeller hub 211, the front cover 212, the impeller shell 213, the impeller blades 214, and the impeller core 215 are fixed to each other and are integrally rotatable about a center of rotation Ax.

The front cover 212 is connected to the crankshaft 11 of the engine 1. When the crankshaft 11 is rotated, the front cover 212 rotates integrally with the crankshaft 11 about the center of rotation Ax illustrated by a dot-and-dash line in FIG. 1. In other words, the front cover 212 is rotatable by being input torque from the engine 1.

The center of rotation Ax is a center axis of the rotation of the crankshaft 11 of the engine 1, the pump impeller 21, the turbine runner 22, the stator wheel 23, and the input shaft 31 of the transmission 3. Hereinafter, a direction orthogonal to the center of rotation Ax is referred to as a radial direction from the center of rotation Ax, a direction along the center of rotation Ax is referred to as an axial direction of the center of rotation Ax, and a direction of rotation about the center of rotation Ax is referred to as a circumferential direction of the center of rotation Ax.

The front cover 212 includes a wall portion 2121 and a peripheral wall 2122. The wall portion 2121 is a substantially disc-shaped portion extending from the impeller hub 211 in the radial direction from the center of rotation Ax. An end portion on an inner peripheral side of the wall portion 2121 is fixed to the impeller hub 211. The peripheral wall 2122 is a substantially cylindrical-shaped portion extending in the axial direction of the center of rotation Ax from an end portion of the wall portion 2121 on an outer peripheral side of the wall portion 2121.

The impeller shell 213 is fixed to the peripheral wall 2122 of the front cover 212. The impeller shell 213 forms an operating oil chamber 216 together with the front cover 212. The operating oil chamber 216 accommodates the operating oil.

The plurality of impeller blades 214 are fixed respectively to an inner surface of the impeller shell 213. The plurality of impeller blades 214 are arranged so as to be arranged in the circumferential direction of the center of rotation Ax via a clearance formed therebetween.

The impeller core 215 is formed into an annular shape, and is fixed to an end portion inside the plurality of impeller blades 214. In other words, the plurality of impeller blades 214 support the impeller core 215 at a position apart from the impeller shell 213. The plurality of impeller blades 214 form a plurality of flow channels between the impeller shell 213 and the impeller core 215.

The turbine runner 22 includes a turbine shell 221, a plurality of turbine blades 222, a turbine core 223, and a turbine hub 224. The turbine shell 221, the turbine blades 222, the turbine core 223, and the turbine hub 224 are fixed to each other, and are integrally rotatable about the center of rotation Ax.

The turbine shell 221 is arranged in an interior of the operating oil chamber 216, and is formed into an annular shape. The plurality of turbine blades 222 are fixed individually to an inner surface of the turbine shell 221. The plurality of turbine blades 222 are arranged so as to be arranged in the circumferential direction of the center of rotation Ax via a clearance formed therebetween.

The turbine core 223 is formed into an annular shape, and is fixed to an end portion inside the plurality of turbine blades 222. In other words, the plurality of turbine blades 222 support the turbine core 223 at a position apart from the turbine shell 221. The plurality of turbine blades 222 form a plurality of flow channels between the turbine shell 221 and the turbine core 223.

The turbine hub 224 is fixed to an end portion of an inner peripheral side of the turbine shell 221 by a rivet 225. The turbine hub 224 is connected to the input shaft 31 of the transmission 3. The turbine hub 224 is rotatable integrally with the input shaft 31 about the center of rotation Ax.

A bearing 24 is mounted on an outer peripheral surface of the turbine hub 224. The bearing 24 supports the impeller hub 211 so as to be relatively rotatable with respect to the turbine hub 224. In other words, the pump impeller 21 and the turbine runner 22 are relatively rotatable with each other.

An end portion of a flow channel formed on the pump impeller 21 on an outer periphery side faces an end portion of a flow channel formed on the turbine runner 22 on an outer periphery side. The stator wheel 23 is arranged between an end portion of the flow channel formed on the pump impeller 21 on an inner periphery side and an end portion of the flow channel formed on the turbine runner 22 on the inner peripheral side. In other words, the stator wheel 23 is located between the pump impeller 21 and the turbine runner 22.

The stator wheel 23 includes an outer shell 231, an inner core 232, and a plurality of stator blades 233. The outer shell 231 is an example of a first annular portion, and is also referred to, for example, as an inner peripheral portion. The inner core 232 is an example of a second annular portion, and is also referred to, for example, as an outer peripheral portion. The plurality of stator blades 233 are an example of a plurality of blades, and is also referred to, for example, as a wall.

Figure 2:
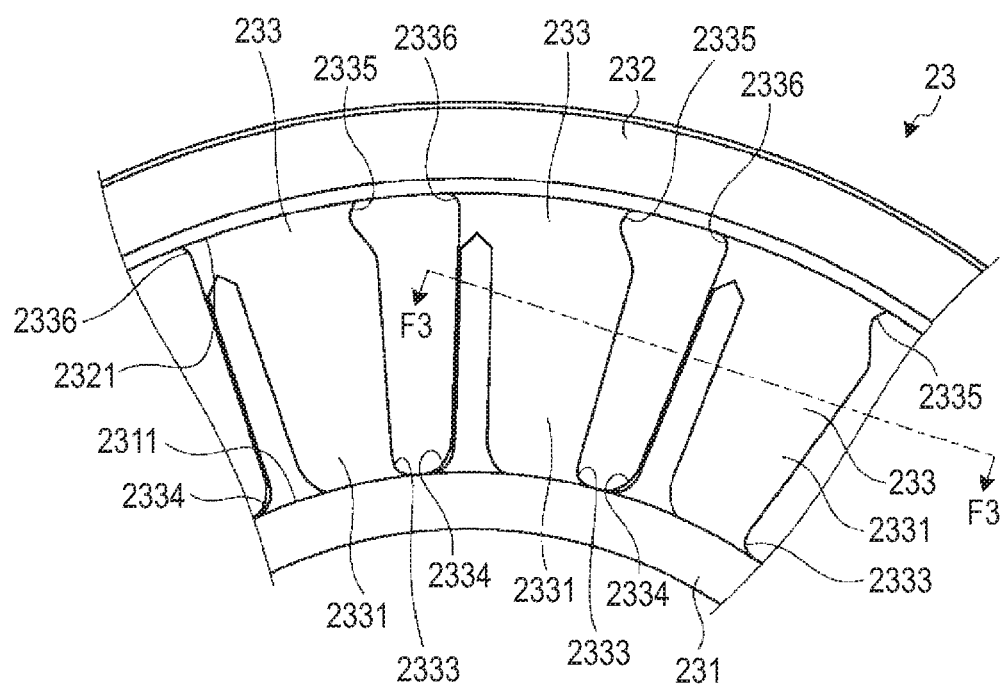
FIG. 2 is a front view illustrating part of a stator wheel of the embodiment.

FIG. 2 is a front view illustrating part of the stator wheel 23 from the axial direction of the center of rotation Ax. The outer shell 231 is formed into a substantially cylindrical shape. The inner core 232 is formed into a substantially cylindrical shape having an inner diameter larger than an outer diameter of the outer shell 231. The inner core 232 is arranged at a position away from the outer shell 231 in the radial direction from the center of rotation Ax and surrounds the outer shell 231.

The plurality of stator blades 233 extend in the radial directions of the center of rotation Ax respectively between the outer shell 231 and the inner core 232. An end portion of the stator blades 233 on the inner peripheral side is connected to an outer peripheral surface 2311 of the outer shell 231. An end portion of the stator blades 233 on the outer peripheral side is connected to an inner peripheral surface 2321 of the inner core 232.

The plurality of stator blades 233 are provided so as to be arranged in the circumferential direction of the center of rotation Ax via a clearance formed therebetween. The plurality of stator blades 233 form a plurality of flow channels between the outer shell 231 and the inner core 232.

As illustrated in FIG. 1, one end portion of a flow channel formed on the stator wheel 23 faces an end portion of the flow channel formed on the pump impeller 21 on the inner peripheral side. The other end portion of a flow channel formed on the stator wheel 23 faces an end portion of the flow channel formed on the turbine runner 22 on the inner peripheral side.

The outer shell 231 of the stator wheel 23 is attached, for example, to a fixed axis by a one-way clutch 25. The fixed axis extends, for example, from the transmission 3 side, and is a cylindrical axis covering an outer peripheral surface of the input shaft 31.

The one-way clutch 25 restricts the stator wheel 23 from rotating in one direction of rotation about the center of rotation Ax. In addition, the one-way clutch 25 allows the stator wheel 23 to rotate in the other direction of rotation about the center of rotation Ax. Therefore, the stator wheel 23 is rotatable about the center of rotation Ax relatively with respect to the pump impeller 21 and the turbine runner 22.

The torque converter 2 may further include other components such as a lockup clutch and a dumper. The lockup clutch is configured to restrict a relative rotation of the turbine runner 22 with respect to the pump impeller 21, and transmit the torque directly from the pump impeller 21 to the turbine runner 22.

Figure 3:
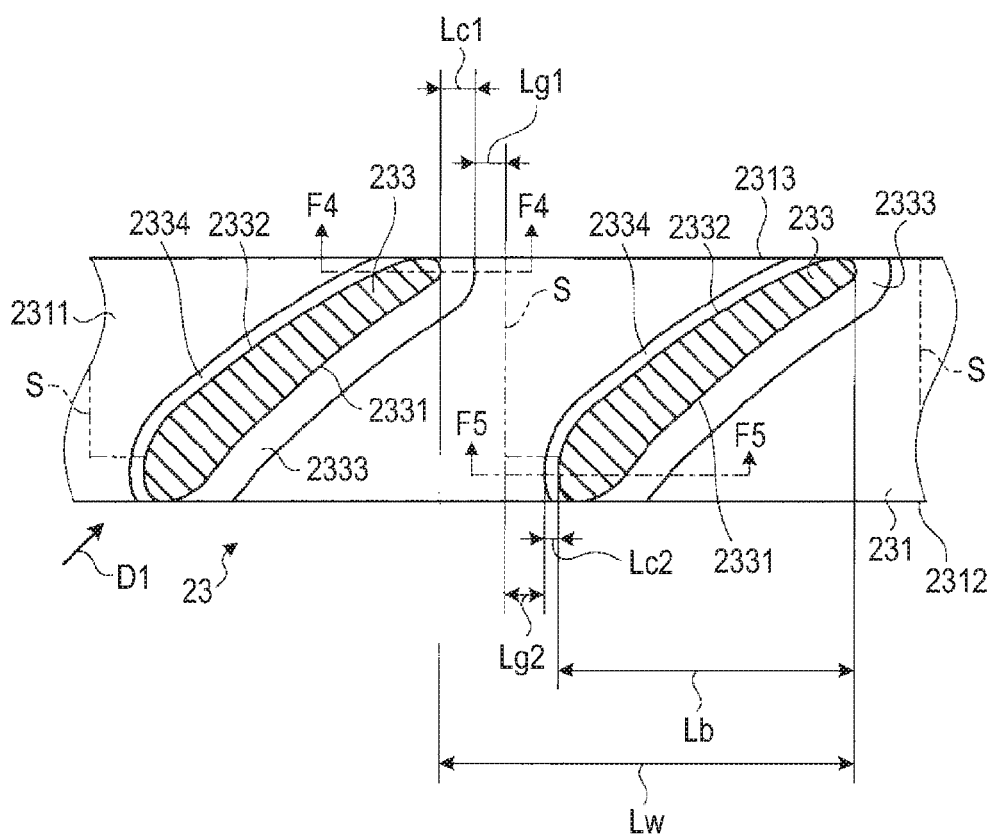
FIG. 3 is a cross-sectional view schematically illustrating the part of the stator wheel of the embodiment taken along line F3-F3 in FIG. 2.

The stator wheel 23 will be described below in detail. FIG. 3 is a cross-sectional view schematically illustrating part of the stator wheel 23 taken along line F3-F3 in FIG. 2. As illustrated in FIG. 3, the stator blades 233 extend from one end portion 2312 to the other end portion 2313 of the outer shell 231 in the axial direction of the center of rotation Ax along a direction D1. In other words, the stator blades 233 extend between one end portion 2312 and the other end portion 2313 of the outer shell 231 along the direction D1.

In other words, as illustrated in FIG. 1, the stator blades 233 extend from one end portion 2322 to the other end portion 2323 of the inner core 232 in the axial direction of the center of rotation Ax along the direction D1. The stator blades 233 may be located away from at least one of the end portions 2312 and 2313 of the outer shell 231 and the end portions 2322 and 2323 of the inner core 232.

As illustrated in FIG. 3, the direction D1 is a direction inclined circumferentially with respect to the axial direction of the center of rotation Ax. The stator blades 233 each extend along such a direction D1 from one end portion 2312 to the other end portion 2313 of the stator blade 233.

The stator blades 233 each have a positive pressure surface 2331 and a negative pressure surface 2332. The positive pressure surface 2331 is an example of a first surface and may be referred to, for example, as a side surface. The negative pressure surface 2332 is an example of a second surface and may be referred to, for example, as a side surface.

The positive pressure surface 2331 is one of the side surfaces of each of the stator blades 233 extending in the direction D1, and is located on the turbine runner 22 side (lower side in FIG. 3). In other words, the positive pressure surface 2331 is provided on one side (right side in FIG. 3) in the circumferential direction of the center of rotation Ax.

The negative pressure surface 2332 is the other side surface of each of the stator blades 233 extending in the direction D1, and is located on the opposite side of the positive pressure surface 2331. The negative pressure surface 2332 is located on the impeller shell 213 side (upper side in FIG. 3) of the pump impeller 21. In other words, the negative pressure surface 2332 is provided on the other side (left side in FIG. 3) in the circumferential direction of the center of rotation Ax.

As illustrated in FIG. 2, each of the stator blades 233 further include a first connecting portion 2333, a second connecting portion 2334, a third connecting portion 2335, and a fourth connecting portion 2336. The first to fourth connecting portions 2333 to 2336 may also be referred to, for example, as a joint line, a joining portion, a coupling portion, a curved surface portion, and a curvature portion.

The first connecting portion 2333 is a portion where a positive pressure surface 2331 of the stator blade 233 and the outer peripheral surface 2311 of the outer shell 231 are connected. The first connecting portion 2333 is formed into a curved surface shape continuing from the positive pressure surface 2331 to the outer peripheral surface 2311 of the outer shell 231.

The second connecting portion 2334 is a portion where the negative pressure surface 2332 of the stator blade 233 and the outer peripheral surface 2311 of the outer shell 231 are connected. The second connecting portion 2334 is formed into a curved surface shape continuing from the negative pressure surface 2332 to the outer peripheral surface 2311 of the outer shell 231.

The third connecting portion 2335 is a portion where the positive pressure surface 2331 of the stator blade 233 and the inner peripheral surface 2321 of the inner core 232 are connected. The third connecting portion 2335 is formed into a curved surface shape continuing from the positive pressure surface 2331 to the inner peripheral surface 2321 of the inner core 232.

The fourth connecting portion 2336 is a portion where the negative pressure surface 2332 of the stator blades 233 and the inner peripheral surface 2321 of the inner core 232 are connected. The fourth connecting portion 2336 is formed into a curved surface shape continuing from the negative pressure surface 2332 to the inner peripheral surface 2321 of the inner core 232.

The stator wheel 23 as described above is manufactured, for example, by a die-casting method in which the metal die is moved in the axial direction of the center of rotation Ax. Therefore, the outer shell 231, the inner core 232, and the stator blades 233 are formed integrally. The stator wheel 23 may be formed by other methods.

As described above, the plurality of stator blades 233 are provided in the circumferential direction of the center of rotation Ax via a clearance formed therebetween. In other words, the plurality of stator blades 233 are arranged so as to avoid overlapping each other in the axial direction of the center of rotation Ax. Therefore, the metal die can be moved in the axial direction of the center of rotation Ax. FIG. 3 illustrates a split line S between a fixed die and a movable die, which are two metal dies by a chain double-dashed line. The split line S is provided between the stator blades 233 adjacent in the circumferential direction of the center of rotation Ax.

As illustrated in FIG. 3, in the circumferential direction of the center of rotation Ax, a length which allows arrangement of the stator blades 233 if defined as Lw, a length of the stator blades 233 is defined as Lb, a length of the first connecting portion 2333 is defined as Lc1, a length of the second connecting portion 2334 is defined as Lc2, a distance between the first connecting portion 2333 and the split line S is defined as Lg1, and a distance between the second connecting portion 2334 and the split line S is defined as Lg2 hereinafter.

In a case where all of the stator blades 233 have the same shape, the length Lw is expressed as the following Expression 1.

$$Lw = 2 \times \pi \times r/n \qquad \text{(Expression 1)}$$

In Expression 1, r corresponds to a distance from the center of rotation Ax to the stator blades 233. For example, r for obtaining the length Lw in the outer peripheral surface 2311 of the outer shell 231 corresponds to a radius of the outer peripheral surface 2311 of the outer shell 231, n is the number of the stator blades 233, and a length Lw is an example of the length obtained by dividing the circumference of an outer peripheral surface of the first annular portion by the number of the blades.

The length Lb is expressed as the following Expression 2.

$$Lb = Lw - ((Lg1 + Lg2) + (Lc1 + Lc2)) \qquad \text{(Expression 2)}$$

The length Lb is an example of a length of the blade in the circumferential direction of the center of rotation. (Lg1+Lg2) is equal to the distance between the first connecting portion 2333 and the second connecting portion 2334 in the circumferential direction of the center of rotation Ax.

Figure 4:
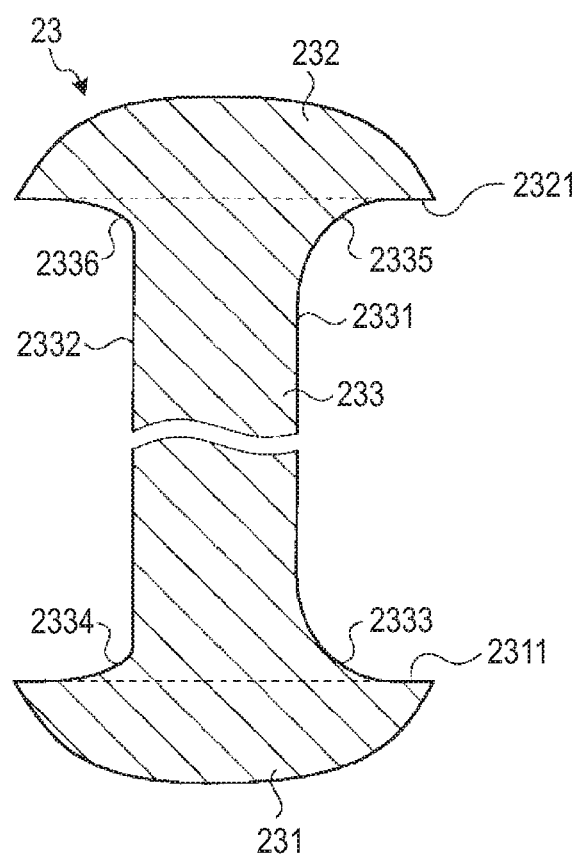
FIG. 4 is a cross-sectional view illustrating the part of the stator wheel of the embodiment taken along line F4-F4 in FIG. 3.

FIG. 4 is a cross-sectional view illustrating part of the stator wheel 23 along line F4-F4 in FIG. 3. Specifically, FIG. 4 illustrates a cross section of the stator wheel 23 on a virtual plane orthogonal to the axial direction of the center of rotation Ax at the end portion on one side (right side in FIG. 3) of one stator blade 233 in the circumferential direction of the center of rotation Ax. FIG. 4 illustrates the outer peripheral surface 2311 of the outer shell 231 and the inner peripheral surface 2321 of the inner core 232 flatly for the convenience of description.

Figure 5:
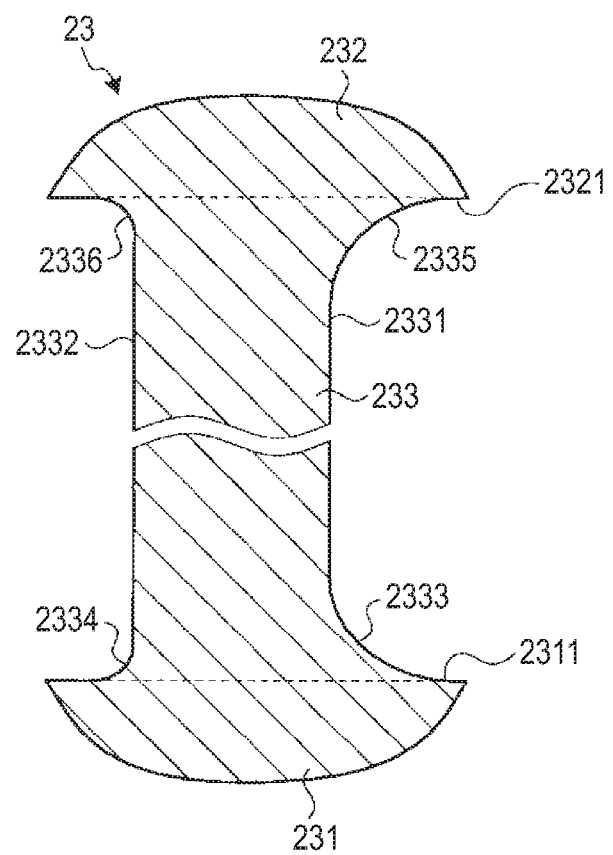
FIG. 5 is a cross-sectional view illustrating the part of the stator wheel of the embodiment taken along line F5-F5 in FIG. 3.

FIG. 5 is a cross-sectional view illustrating part of the stator wheel 23 along line F5-F5. Specifically, FIG. 5 illustrates a cross section of the stator wheel 23 on the virtual plane orthogonal to the axial direction of the center of rotation Ax at the end portion of the stator blade 233 adjacent to the stator blade 233 in FIG. 4 on one side in the circumferential direction of the center of rotation Ax (right side in FIG. 3) on the other side (left side in FIG. 3) in the circumferential direction of the center of rotation Ax. FIG. 5 also illustrates the outer peripheral surface 2311 of the outer shell 231 and the inner peripheral surface 2321 of the inner core 232 flatly for the convenience of description.

A radius of curvature of the first connecting portion 2333 at the end portion of the stator blade 233 illustrated in FIG. 4 is larger than a radius of curvature of the second connecting portion 2334 at the end portion of the stator blade 233 illustrated in FIG. 5. The radius of curvature of part of the first connecting portion 2333 may be equal or smaller than the radius of curvature of at least part of the second connecting portion 2334.

In the same manner, the radius of curvature of the third connecting portion 2335 at the end portion of the stator blade 233 illustrated in FIG. 4 is larger than the radius of curvature of the fourth connecting portion 2336 at the end portion of the stator blade 233 illustrated in FIG. 5. The radius of curvature of part of the third connecting portion 2335 may be equal or smaller than the radius of curvature of at least part of the fourth connecting portion 2336.

An example of the operation of the torque converter 2 will be described below. When the engine 1 in FIG. 1 is started, the torque is input from the engine 1 to the front cover 212 of the pump impeller 21 via the crankshaft 11. Accordingly, the pump impeller 21 rotates integrally with the crankshaft 11 about the center of rotation Ax.

The pump impeller 21 is rotated to cause the operating oil accommodated in the operating oil chamber 216 to flow along the flow channel in the pump impeller 21. The operating oil flows toward the end portion of the flow channel in the pump impeller 21 on the outer peripheral side. In other words, the pump impeller 21 causes the operating oil to flow along the impeller blades 214.

The operating oil flows from the end portion of the flow channel in the pump impeller 21 on the outer peripheral side to the end portion of the flow channel of the turbine runner 22 on the outer peripheral side, and applies pressure on the turbine blades 222. Accordingly, the turbine runner 22 rotates about the center of rotation Ax. In other words, the turbine runner 22 rotates by torque being input from the rotating pump impeller 21 via the flowing operating oil. The turbine runner 22 rotates to output the torque to the input shaft 31 of the transmission 3.

The operating oil flows from the end portion of the flow channel of the turbine runner 22 on the inner peripheral side to one of the end portions of the flow channel in the stator wheel 23. The operating oil is regulated in flowing direction by the stator wheel 23, and flows from the other end portion of the flow channel in the stator wheel 23 into the end portion of the flow channel in the pump impeller 21 on the inner peripheral side. In this manner, the operating oil circulates in the pump impeller 21, the turbine runner 22, and the stator wheel 23. By the direction of flow of the operating oil regulated by the stator wheel 23, the torque converter 2 can amplify the power of the engine 1.

Figure 6:
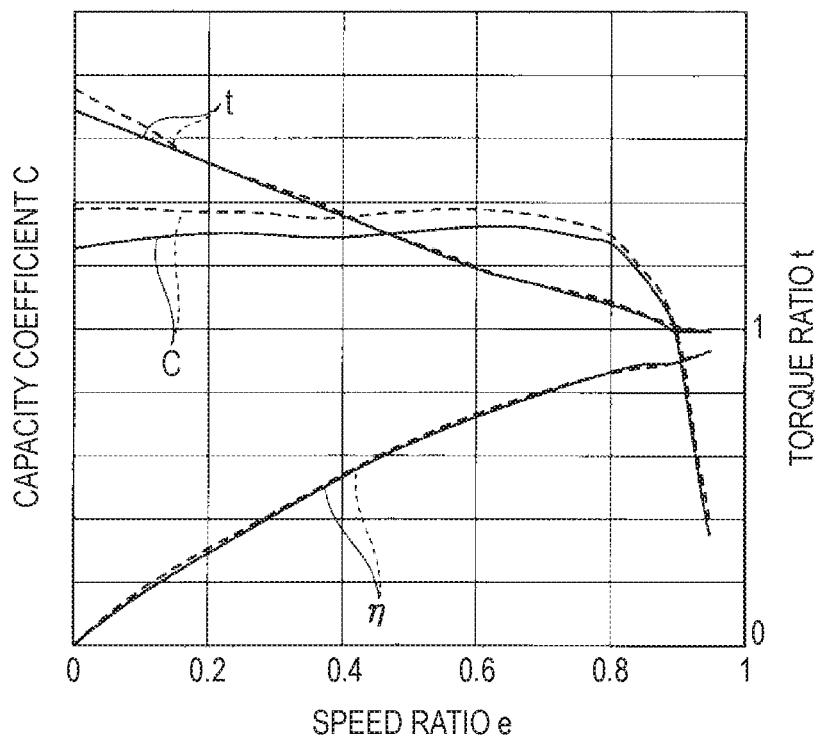
FIG. 6 is a graph illustrating examples of performances of the torque converter.

FIG. 6 is a graph illustrating examples of performances of the torque converter 2. FIG. 6 illustrates a capacity coefficient C, a torque ratio t, and an efficiency η with respect to a speed ratio e of the torque converter 2. The speed ratio e indicates a rotation velocity of the turbine runner 22 with respect to the rotation velocity of the pump impeller 21.

The capacity coefficient C is expressed by the following Expression 3.

$$C = Te/NE^2 \qquad \text{(Expression 3)}$$

In Expression 3, Te indicates output torque of the engine 1 which is input to the pump impeller 21, and NE indicates a rotation velocity of the pump impeller 21. The torque ratio t indicates a ratio of the torque output by the turbine runner 22 with respect to the torque input to the pump impeller 21.

Broken lines on a graph in FIG. 6 indicate examples of the respective performances of the torque converter 2 of the present embodiment. Solid lines on a graph in FIG. 6 indicate examples of respective performances of the torque converter shown as a comparative example (hereinafter, referred to as a comparative example).

A radius of curvature of the first connecting portion (2333) of the comparative example (hereinafter, elements of the comparative example are indicated with brackets for discrimination) and a radius of curvature of the second connecting portion (2334) are equal to the radius of curvature of the first connecting portion 2333 of the torque converter 2 of present embodiment. Furthermore, a radius of curvature of the third connecting portion (2335) of the comparative example and a radius of curvature of the fourth connecting portion (2336) are equal to the radius of curvature of the third connecting portion 2335 of the torque converter 2 of the present embodiment. In other words, the radii of curvature of the connecting portions of the comparative example are constant.

At the time point when the engine 1 is started, and the pump impeller 21 starts rotation, the turbine runner 22 is in a standstill state (stall state). When the turbine runner 22 is in the stall state, the speed ratio e is "0".

The turbine runner 22 starts rotation by inputting torque from the pump impeller 21 via the operating oil. The speed ratio e approaches "1" as the rotation velocity of the pump impeller 21 gets closer to the rotation velocity of the turbine runner 22.

Figure 7:
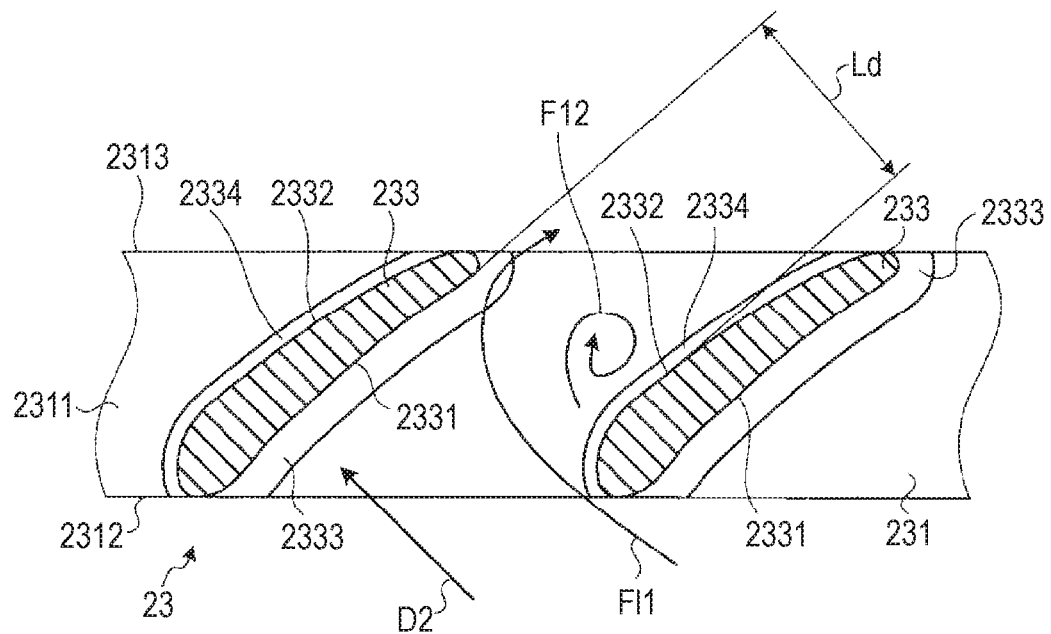
FIG. 7 is a cross-sectional view schematically illustrating part of the stator wheel in a state of a low-speed ratio of the embodiment.

FIG. 7 is a cross-sectional view schematically illustrating part of the stator wheel 23 in a state of a low-speed ratio. FIG. 7 illustrates part of the stator wheel 23 in a state in which the speed ratio e is, for example, 0.0 to 0.2. In other words, a state of the low-speed ratio includes the stall state. The speed ratio e in the state of the low-speed ratio is not limited thereto.

In the state of the low-speed ratio (stall state), the operating oil flowing from the turbine runner 22 toward the pump impeller 21 flows toward a direction D2 illustrated in FIG. 7. As illustrated in FIG. 7 by an arrow F11, the operating oil flows from one end portion of the stator wheel 23 into the flow channel formed between the stator blades 233, and flows toward the positive pressure surfaces 2331 of the stator blades 233. Furthermore, the operating oil flows along the positive pressure surfaces 2331 of the stator blades 233, and flows from the other end portion of the stator wheel 23 toward the flow channel in the pump impeller 21.

Since the operating oil flows as described above, in the state of the low-speed ratio (stall state), pressure applied from the operating oil flowing from the turbine runner 22 toward the pump impeller 21 to the negative pressure surface 2332 is lower than pressure applied to the positive pressure surface 2331.

In the flow channel between the stator blades 233 in the vicinity of the negative pressure surface 2332 of the stator blade 233, separation of the operating oil flow indicated by an arrow F12 in FIG. 7 may occur. An amount of emergence of the separation of the operating oil flow is influenced by an outlet width Ld illustrated in FIG. 7. The outlet width Ld is a distance between the adjacent stator blades 233 at the end portion of the flow channel in the stator wheel 23.

Figure 8:
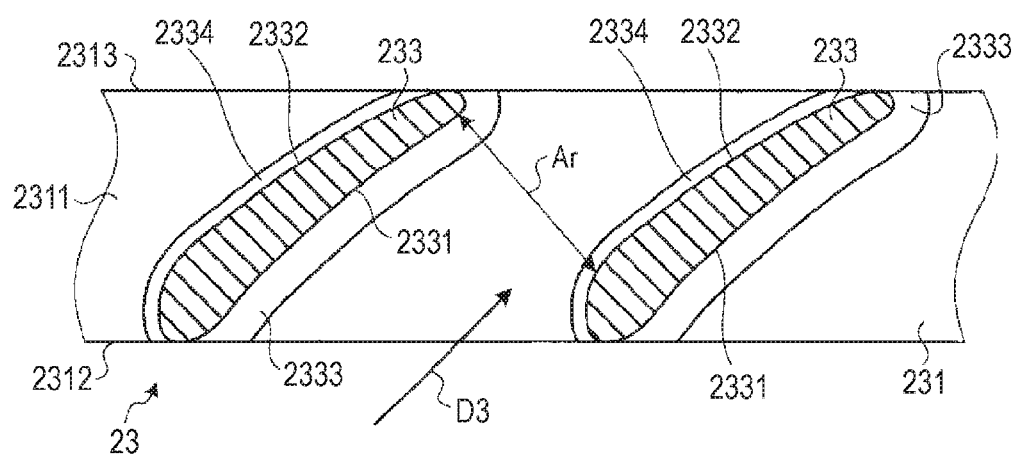
FIG. 8 is a cross-sectional view schematically illustrating part of the stator wheel in a state of a high-speed ratio of the embodiment.

FIG. 8 is a cross-sectional view schematically illustrating part of the stator wheel 23 in a state of a high-speed ratio. FIG. 8 illustrates part of the stator wheel 23 in a state in which the speed ratio e is 0.8 to 1.0, for example. The speed ratio e in the state of the high-speed ratio is not limited thereto.

A direction in which the operating oil flows from the turbine runner 22 to the pump impeller 21 varies with an increase in the speed ratio e. In the state of the high-speed ratio, the operating oil flowing from the turbine runner 22 toward the pump impeller 21 flows toward a direction D3 illustrated in FIG. 8. The direction D3 in which the operating oil flows in the state of the high-speed ratio is closer to the direction D1 in which the stator blades 233 extend than the direction D2 in which the operating oil flows in the state of the low-speed ratio.

The operating oil flows from one end portion of the stator wheel 23 into the flow channel formed between the stator blades 233, and flows toward, for example, the negative pressure surface 2332 of the stator blade 233. Furthermore, the operating oil flows along the negative pressure surface 2332 of the stator blade 233, and flows from the other end portion of the stator wheel 23 toward the flow channel in the pump impeller 21. The operating oil flow in the state of the high-speed ratio is not limited thereto.

The stator wheel 23 supported by the one-way clutch 25 rotates about the center of rotation Ax by the operating oil pressing the negative pressure surface 2332. Accordingly, the pump impeller 21, the turbine runner 22, and the stator wheel 23 rotate respectively, and the stator wheel 23 is prevented from impairing the rotation of the pump impeller 21.

The size of the capacity coefficient C is influenced by a flow channel surface Ar illustrated in FIG. 8. The flow channel surface Ar indicates an average value of surface areas of the flow channel in the stator wheel 23. The flow channel surface Ar of the stator wheel 23 has an influence on an average value Ac of surface areas of the flow channel in the torque converter 2. The average flow channel surface Ac of the torque converter 2 has an influence on the size of the capacity coefficient C as expressed by the following Expression 4 obtained from the above-described Expression 3.

$$C = Te/NE^2 = (\rho \times Q \times (v_o \times r_0 - v_i \times r_i))/NE^2 = (\rho \times Ac \times V_A \times (v_o \times r_0 - v_i \times r_i))/NE^2 \quad \text{(Expression 4)}$$

In Expression 4, $\rho$ indicates a density of the operating oil, Q indicates a flow rate in the flow channel in the torque converter 2, $v_o$ indicates a flow rate of the operating oil in the circumferential direction at an exit of the flow channel in the pump impeller 21, $r_0$ indicates a radius at the exit of the flow channel in the pump impeller 21, $v_i$ indicates a flow rate of the operating oil in the circumferential direction at an exit of the flow channel in the stator wheel 23, $r_i$ indicates a radius at the exit of the flow channel in the stator wheel 23, and $v_A$ indicates an average value of the flow rates of the operating oil in the flow channel in the torque converter 2.

The torque converter 2 of present embodiment and the comparative example will be compared now. In the circumferential direction of the center of rotation Ax, a length of the first connecting portion (2333) and a length of the second connecting portion (2334) of the comparative example are equal to a length Lc1 of the first connecting portion 2333 of the torque converter 2 of present embodiment illustrated in FIG. 3.

A length (Lb') of the stator blades (233) of the comparative example as described above is expressed as the following Expression 5.

$$Lb' = Lw - ((Lg1 + Lg2) + (Lc1 + Lc2)) = Lw - ((Lg1 + Lg2) + (2 \times Lc1)) \quad \text{(Expression 5)}$$

The length (Lb') of the stator blades (233) of the comparative example is an example of a length obtained by subtracting twice a length of the first connecting portion in the circumferential direction of the center of rotation and a distance between the first connecting portion and the second connecting portion in the circumferential direction of the center of rotation from a length obtained by dividing the circumference of the outer peripheral surface of the first annular portion by the number of blades.

The length Lc2 of the second connecting portion 2334 of the present embodiment in the circumferential direction of the center of rotation Ax is shorter than the length Lc1 of the first connecting portion 2333. Therefore, the length Lb of the stator blades 233 of the present embodiment is longer than the length (Lb') of the stator blades (233) of the comparative example. In other words, the length Lb is longer than a length obtained by subtracting twice a length of the first connecting portion in the circumferential direction of the first annular portion and a distance between the first connecting portion and the second connecting portion in the circumferential direction of the first annular portion from a length obtained by dividing the circumference of an outer peripheral surface of the first annular portion by the number of blades. Therefore, an inclination of the direction D1 in which the stator blade 233 extends with respect to the axial direction of the center of rotation Ax is larger than an inclination of the direction (D1) in which the stator blade (233) of the comparative example extends with respect to the axial direction of the center of rotation Ax.

In the stator wheel 23 of the present embodiment described above, the outlet width Ld illustrated in FIG. 7 is narrower than the outlet width (Ld) of the comparative example. The amount of emergence of separation of the operating oil flow in the flow channel in the stator wheel 23 is reduced with a reduction of the outlet width Ld. Therefore, the amount of emergence of the separation of the operating oil flow in the stator wheel 23 of present embodiment is smaller than the amount of emergence of separation of the operating oil flow in the stator wheel (23) of the comparative example. Therefore, the stator wheel 23 of present embodiment have a smaller loss of kinetic energy of the operating oil than that in the comparative example.

In the stator wheel 23 of present embodiment, the flow channel surface Ar illustrated in FIG. 8 is larger than the flow channel surface (Ar) of the comparative example. Therefore, as illustrated in FIG. 6, the capacity coefficient C of the torque converter 2 of present embodiment is larger than the capacity coefficient (C) of the comparative example.

In order to optimize characteristics of an increase in rotation velocity NE with respect to an increase in torque Te, a large displacement engine 1 having larger torque Te is set to have a larger capacity coefficient C, and a small displacement engine 1 having smaller torque Te is set to have a smaller capacity coefficient C. In other words, the torque converter 2 of the present embodiment can be used in the engine 1 having large output torque.

In the torque converter 2 according to present embodiment described above, the positive pressure surface 2331 of the stator blade 233 receives higher pressure from the operating oil flowing from the turbine runner 22 toward the pump impeller 21 in the stall state than the negative pressure surface 2332. A radius of curvature of the first connecting portion 2333, which is a portion where the positive pressure surface 2331 and the outer shell 231 are connected, on a virtual plane orthogonal to the axial direction of the center of rotation Ax at an end portion on one side in the circumferential direction of the center of rotation Ax of one stator blade 233 is larger than a radius of curvature of the second connecting portion 2334, which is a portion where the negative pressure surface 2332 and the outer shell 231 are connected, at an end portion on the other side in the circumferential direction of the center of rotation Ax of another stator blade 233 adjacent to one side in the circumferential direction of the center of rotation Ax with respect to one stator blade 233 on a virtual plane orthogonal to the axial direction of the center of rotation Ax.

The torque converter 2 as described above is, compared with the comparative example for example, is capable of restricting lowering of durability of the stator blade 233 with respect to the pressure that the positive pressure surface 2331 receives from the operating oil while reducing intervals between the stator blades 233 in the circumferential direction. In other words, the positive pressure surface 2331 that receives a larger pressure from the operating oil is reinforced by the first connecting portion 2333 having a larger radius of curvature. In contrast, by setting the radius of curvature of the second connecting portion 2334 of the negative pressure surface 2332 that is less likely to receive pressure to be smaller, the intervals of the stator blades 233 in the circumferential direction can be made smaller.

In addition, since the intervals between the stator blades 233 in the circumferential direction can be made shorter, the length Lb of the stator blade 233 in the circumferential direction can be increased, and rectification ability of the operating oil and performances of the stator wheel 23 can be improved. In addition, the number of the stator blades 233 may further be increased.

At a portion where the stator blades 233 and the inner core 232 are connected, the radius of curvature of the third connecting portion 2335 is larger than the radius of curvature of the third connecting portion 2336. Accordingly, the torque converter 2 as described above is capable of restricting lowering of durability of the stator blade 233 with respect to the pressure that the positive pressure surface 2331 receives from the operating oil while making intervals of the stator blades 233 in the circumferential direction further shorter.

In addition, since the intervals between the stator blades 233 in the circumferential direction can be made shorter, the length Lb of the stator blade 233 in the circumferential direction can be increased, and rectification ability of the operating oil and performances of the stator wheel 23 can be improved.

The length Lb of the stator blade 233 in the circumferential direction of the center of rotation Ax is longer than a length (Lb') obtained by subtracting twice a length of the first connecting portion 2333 in the circumferential direction of the center of rotation Ax and a distance between the first connecting portion 2333 and the second connecting portion 2334 in the circumferential direction of the center of rotation Ax from a length obtained by dividing the circumference of the outer peripheral surface 2311 of the outer shell 231 by the number of the stator blade 233. In other words, the length Lb of the stator blade 233 in the circumferential direction is longer than the length (Lb') of the stator blade 233 in the case where the radius of curvature of the first connecting portion 2333 and the radius of curvature of the second connecting portion 2334 are the same. Accordingly, the rectification capability of the operating oil and the performances of the stator wheel 23 can be improved.

The embodiment disclosed here described above does not limit the scope of this disclosure, and is only an example included in the scope of this disclosure. An embodiment disclosed here may be configured in such a manner that at least part of specific applications, structures, shapes, operations, and effects, for example, may be modified, omitted, or added to those of the embodiment described above without departing the gist of this disclosure.

For example, in the above-described embodiment, the radius of curvature of the first connecting portion 2333 is larger than the radius of curvature of the second connecting portion 2334, and the radius of curvature of the third connecting portion 2335 is larger than the radius of curvature of the fourth connecting portion 2336. However, in the case where the radius of curvature of the first connecting portion 2333 is larger than the radius of curvature of the second connecting portion 2334, the radii of curvature of the third and fourth connecting portions 2335 and 2336 may be the equal. In this case, the outer shell 231 is an example of the first annular portion, and the inner core 232 is an example of the second annular portion. In the case where the radius of curvature of the third connecting portion 2335 is larger than the radius of curvature of the fourth connecting portion 2336, the radii of curvature of the first and second connecting portions 2333 and 2334 may be equal. In this case, the outer shell 231 is an example of the second annular portion, and the inner core 232 is an example of the first annular portion.

A stator wheel according to an aspect of this disclosure is a stator wheel of a torque converter. The torque converter includes a pump configured to be rotatable in response to an input of torque from a motor and to cause operating fluid to flow by rotation; and a turbine configured to be rotatable and to be connectable to the rotational shaft in response to an input of torque from the pump via the flowing operating fluid, and to be capable of output the torque to the rotational shaft by rotation thereof. The stator wheel is located between the pump and the turbine and includes: a first annular portion configured to be rotatable about a center of rotation; a second annular portion away from the first annular portion in a radial direction of the first annular portion; and a plurality of blades provided at intervals in a circumferential direction of the first annular portion, the plurality of blades each extending between the first annular portion and the second annular portion in the radial direction of the first annular portion, extending toward one side in the circumferential direction of the first annular portion as it goes in an axial direction of the rotational shaft, being formed integrally with the first annular portion and the second annular portion, and including a first surface provided on one side in the circumferential direction of the first annular portion and a second surface located on an opposite side from the first surface in the circumferential direction of the first annular portion and configured to receive pressure, which is lower than that the first surface receives, from the operating fluid flowing from the turbine toward the pump in a state in which the pump rotates and the turbine is standstill, a radius of curvature of a first connecting portion which is a portion where the first surface and the first annular portion are connected at an end portion on one side of one of the plurality of blades in the circumferential direction of the first annular portion on a virtual plane orthogonal to the axial direction of the rotational shaft is larger than a radius of curvature of a second connecting portion, which is a portion where the second surface and the first annular portion are connected, at an end portion on the other side in the circumferential direction of the first annular portion of the other blade adjacent to the one blade on one side in the circumferential direction of the first annular portion on a virtual plane orthogonal to the axial direction of the rotational shaft. Therefore, lowering of durability of the blade with respect to the pressure that the first surface receives from the operating fluid can be suppressed while increasing the length of the blade in the circumferential direction more than the case where, for example, the radius of curvature of the first connecting portion and the radius of curvature of the second connecting portion are equal.

The stator wheel of a torque converter according to the aspect of this disclosure may be configured such that a radius of curvature of a third connecting portion which is a portion where the first surface and the second annular portion are connected at an end portion on one side of one blade in the circumferential direction of the first annular portion on a virtual plane orthogonal to the axial direction of the rotational shaft is larger than a radius of curvature of a fourth connecting portion, which is a portion where the second surface and the second annular portion are connected at an end portion on the other side in the circumferential direction of the first annular portion of the other blade adjacent to the one blade on one side in the circumferential direction of the first annular portion on a virtual plane orthogonal to the axial direction of the rotational shaft. Therefore, lowering of durability of the blade with respect to the pressure that the first surface receives from the operating fluid can be suppressed while increasing the length of the blade in the circumferential direction more than the case where, for example, the radius of curvature of the first connecting portion and the radius of curvature of the second connecting portion are equal.

The stator wheel of a torque converter according to the aspect of this disclosure may be configured such that a length of the blade in the circumferential direction of the first annular portion is longer than a length obtained by subtracting twice a length of the first connecting portion in the circumferential direction of the first annular portion and a distance between the first connecting portion and the second connecting portion in the circumferential direction of the first annular portion from a length obtained by dividing the circumference of the outer peripheral surface of the first annular portion by the number of blades. Therefore, the rectification capability of the operating fluid and the performances of the stator wheel can be improved.

A torque converter according to an aspect of this disclosure includes any one of the stator wheels described above. Therefore, lowering of durability of the blade with respect to the pressure that the first surface receives from the operating fluid can be suppressed while increasing the length of the blade in the circumferential direction more than the case where, for example, the radius of curvature of the first connecting portion and the radius of curvature of the second connecting portion are equal.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A stator wheel for a torque converter including a pump configured to be rotatable in response to an input of torque from a motor and to cause operating fluid to flow by rotation; and a turbine configured to be rotatable in response to an input of torque from the pump via the flowing operating fluid, and to be capable of outputting the torque to a rotational shaft by rotation thereof, the stator wheel being configured to be located between the pump and the turbine, and comprising:
   a first annular portion configured to be rotatable about a center of rotation extending in an axial direction;
   a second annular portion away from the first annular portion in a radial direction of the first annular portion; and a plurality of blades provided at intervals in a circumferential direction of the first annular portion, the plurality of blades each extending between the first annular portion and the second annular portion in the radial direction of the first annular portion, extending in a direction inclined circumferentially with respect to the axial direction, being formed integrally with the first annular portion and the second annular portion, and including a first surface provided on one side in the circumferential direction of the first annular portion and a second surface located on an opposite side from the first surface in the circumferential direction of the first annular portion and configured to receive pressure, which is lower than that the first surface receives, from the operating fluid flowing from the turbine toward the pump in a state in which the pump rotates and the turbine is standstill, wherein a radius of curvature of a first connecting portion which is a portion where the first surface and the first annular portion are connected at an end portion on one side of one of the plurality of blades in the circumferential direction of the first annular portion on a virtual plane orthogonal to the axial direction of the rotational shaft is larger than a radius of curvature of a second connecting portion which is a portion where the second surface and the first annular portion are connected at an end portion on an other side in the circumferential direction of the first annular portion of an other of the plurality of blades adjacent to the one of the plurality of blades on the one side in the circumferential direction of the first annular portion on a virtual plane orthogonal to the axial direction of the rotational shaft, and wherein a radius of curvature of a third connecting portion which is a portion where the first surface and the second annular portion are connected at an end portion on the one side of the one blade in the circumferential direction of the first annular portion on a virtual plane orthogonal to the axial direction of the rotational shaft is lamer than a radius of curvature of a fourth connecting portion which is a portion where the second surface and the second annular portion are connected at an end portion on the other side in the circumferential direction of the first annular portion of the other blade adjacent to the one blade on the one side in the circumferential direction of the first annular portion on a virtual plane orthogonal to the axial direction of the rotational shaft.

2. The stator wheel according to claim 1,
wherein a length of the blade in the circumferential direction of the first annular portion is longer than a length obtained by subtracting twice a length of the first connecting portion in the circumferential direction of the first annular portion and a distance between the first connecting portion and the second connecting portion in the circumferential direction of the first annular portion from a length obtained by dividing the circumference of an outer peripheral surface of the first annular portion by the number of blades.

3. The stator wheel according to claim 1, wherein shapes of the first and second connecting portions on a virtual plane orthogonal to the axial direction of the rotational shaft are concave.

* * * * *